(12) United States Patent
Farley et al.

(10) Patent No.: US 7,632,180 B2
(45) Date of Patent: Dec. 15, 2009

(54) METHOD OF MAKING A ROTOR FOR A THRESHING SYSTEM OF AN AGRICULTURAL COMBINE

(75) Inventors: Herbert M. Farley, Elizabethtown, PA (US); Wayne T. Flickinger, New Providence, PA (US); Mark S. Epperly, Sherrard, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/712,146

(22) Filed: Feb. 28, 2007

(65) Prior Publication Data

US 2008/0207286 A1 Aug. 28, 2008

(51) Int. Cl.
*A01F 7/06* (2006.01)
(52) U.S. Cl. .......................... 460/66; 29/895
(58) Field of Classification Search ................. 228/56.3, 228/135, 102, 171, 146, 262.41; 29/895, 29/513, 521; 460/66
See application file for complete search history.

(56) References Cited

U.S. PATENT DOCUMENTS

| 145,950 | A | | 12/1873 | Jeralds |
|---|---|---|---|---|
| 563,932 | A | | 7/1896 | Leavenworth |
| 621,729 | A | | 3/1899 | Wilmot |
| 1,450,935 | A | | 4/1923 | Anderson |
| 1,773,068 | A | | 8/1930 | Vienneau |
| 1,863,873 | A | | 6/1932 | Quarnstrom |
| 5,505,365 | A | | 4/1996 | Olsen ......................... 228/135 |
| 6,036,598 | A | * | 3/2000 | Harden et al. ................. 460/66 |
| 6,193,131 | B1 | | 2/2001 | Oud et al. ................... 228/56.3 |
| 6,264,553 | B1 | * | 7/2001 | Neumann et al. ............. 460/71 |
| 6,325,714 | B1 | * | 12/2001 | Tanis et al. .................... 460/71 |
| 6,375,564 | B1 | * | 4/2002 | Amann et al. ................. 460/66 |
| 6,749,002 | B2 | | 6/2004 | Grinberg et al. ............. 164/46 |
| 2005/0013954 | A1 | | 1/2005 | Kaegi et al. ................ 428/36.9 |
| 2007/0026913 | A1 | * | 2/2007 | Kuchar ....................... 460/112 |

FOREIGN PATENT DOCUMENTS

JP 2004032895 A * 1/2004
WO WO 2007145502 A1 * 12/2007

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A method of making a rotor for a threshing system of an agricultural combine, the rotor including a main body segment made from a sheet formed into a tube and including specially shaped interlocking edges forming a serpentine joint routed locations where threshing element mounts attach to the rotor.

9 Claims, 3 Drawing Sheets

METHOD OF MAKING A ROTOR FOR A THRESHING SYSTEM OF AN AGRICULTURAL COMBINE

TECHNICAL FIELD

This invention relates generally to a rotor for the threshing system of an agricultural combine, and a method of making the same, wherein a main body segment of the rotor is a sheet formed into a tube and including interlocking edges shaped so as to be routed around mounting structure for threshing elements of the rotor.

BACKGROUND ART

Many agricultural combines use a rotary threshing or separating system. The system typically includes at least one rotor drivingly rotated within a perforated concave spaced radially outwardly thereof. The rotor will often have a frusto-conical inlet end having a helical flight or flights therearound for conveying a flow of crop material into a space between the rotor and the concave. The main body of the rotor will typically have one or more cylindrical or other shaped outer surface portions including threshing elements, which can include, for instance, rasp bars, which protrude radially outwardly therefrom into the space and which are arranged in a pattern or array for conveying a mat of the crop material along a helical path through the space, while cooperating with features of the concave, e.g. protrusions such as bars or ribs, to separate larger components of the crop, namely crop residue commonly referred to as straw, which includes stalks, stems, cobs and the like, from the smaller grain and material other than grain (MOG). The threshing elements are typically supported on brackets or mounts that are welded or otherwise mounted to the outer surface of the main body segment.

An important parameter for a successful threshing performance is the gap between the radial outer portions of the threshing elements, and the radial innermost features or portions of the surrounding concave. The setting of this gap is an operator function, and will typically be finely adjusted within a range of just a fraction of an inch or a few millimeters before or during operation to achieve a desired threshing capability or performance. Generally, if the gap is set too large, not enough grain will be separated from the straw, resulting in more grain loss. If the gap is too small, threshing quality may suffer, and in particular, the grain may be subjected to damage, particularly cracking, which is highly undesired in most instances. If there are irregularities in the outer surface of the rotor on which a threshing element is mounted such that the threshing element is radially inwardly or outwardly of its desired position, as the rotor is rotated past a particular region of the concave, the gap will vary.

It is well-known to make the main body segment of a rotor from a sheet or sheets of metal, by forming the sheet or sheets into a tube. In the known constructions, the juncture of the edges of the sheet or sheets follows a straight line, or a helical line around the tube, and is typically a welded seam. Also typically in the known constructions, the desired layout of the threshing elements about the outer surface of the main body segment, and the number of threshing elements desired, necessitates welding at least several of the mounting elements for the threshing elements in overlaying relation to the welded seam. As result, to attempt to ensure that the threshing element mounts will position the threshing elements mounted thereto at the proper radial position or distance from the surface, any portions of the welded seam onto which threshing element mounts are to be attached, will typically be ground flush with the outer surface. A disadvantage is that this adds a manufacturing step, and often, an inspection step, one or both of which may have to be repeated to achieve the desired surface level. Another possible disadvantage is that the weld seam may be weakened, so as to be less resistance to damage from rocks inducted by the threshing system.

Accordingly, what is sought is a manufacturing method for a rotor, and a resulting rotor construction, which overcomes one or more of the disadvantages set forth above.

SUMMARY OF THE INVENTION

What is disclosed is a method for making a rotor for a threshing system of an agricultural combine, and a resultant rotor, which avoid one or more of the disadvantages set forth above.

According to a preferred aspect of the invention, the rotor has a main body segment made from a sheet formed into a tube and including specially shaped interlocking edges forming a serpentine joint routed around points of attachment of threshing element mounts to the tube. The serpentine joint is preferably a welded joint and has a generally stepped shape symmetrical about a midpoint between the ends of the tube.

According to a preferred method for making the main body segment of the rotor, the sheet has an outer surface including opposite end portions, a first peripheral edge extending between the end portions and having a stepped shape comprising recessed edge portions and protruding edge portions arranged in an alternating pattern extending between the end portions. The sheet has a second peripheral edge opposite the first peripheral edge and having the stepped shape extending between the end portions, the first and second peripheral edges being configured and positioned so as to be interlockable when brought together for forming the sheet into a tube. The sheet is formed into the tube such that the outer surface extends circumferentially therearound and wherein the opposite end portions of the sheet form opposite circular shaped openings and the first and second peripheral edges are brought together so as to be interlocked. A plurality of threshing element are mounted to the outer surface in a predetermined pattern around the tube, in spaced relation to the first and second peripheral edges.

As a result of the invention, because the attachment points for the threshing element mounts are not coincident with the welded seam connecting the interlocked edges of the tubular rotor body, no grinding or other leveling or treatment of the seams is required for the attachment of the mounts. Thus, manufacturing steps are saved, the seam can be welded, and the mounts welded on, without additional intermediate steps for grinding or inspection.

DETAILED DESCRIPTION OF THE INVENTION

Figure 1:
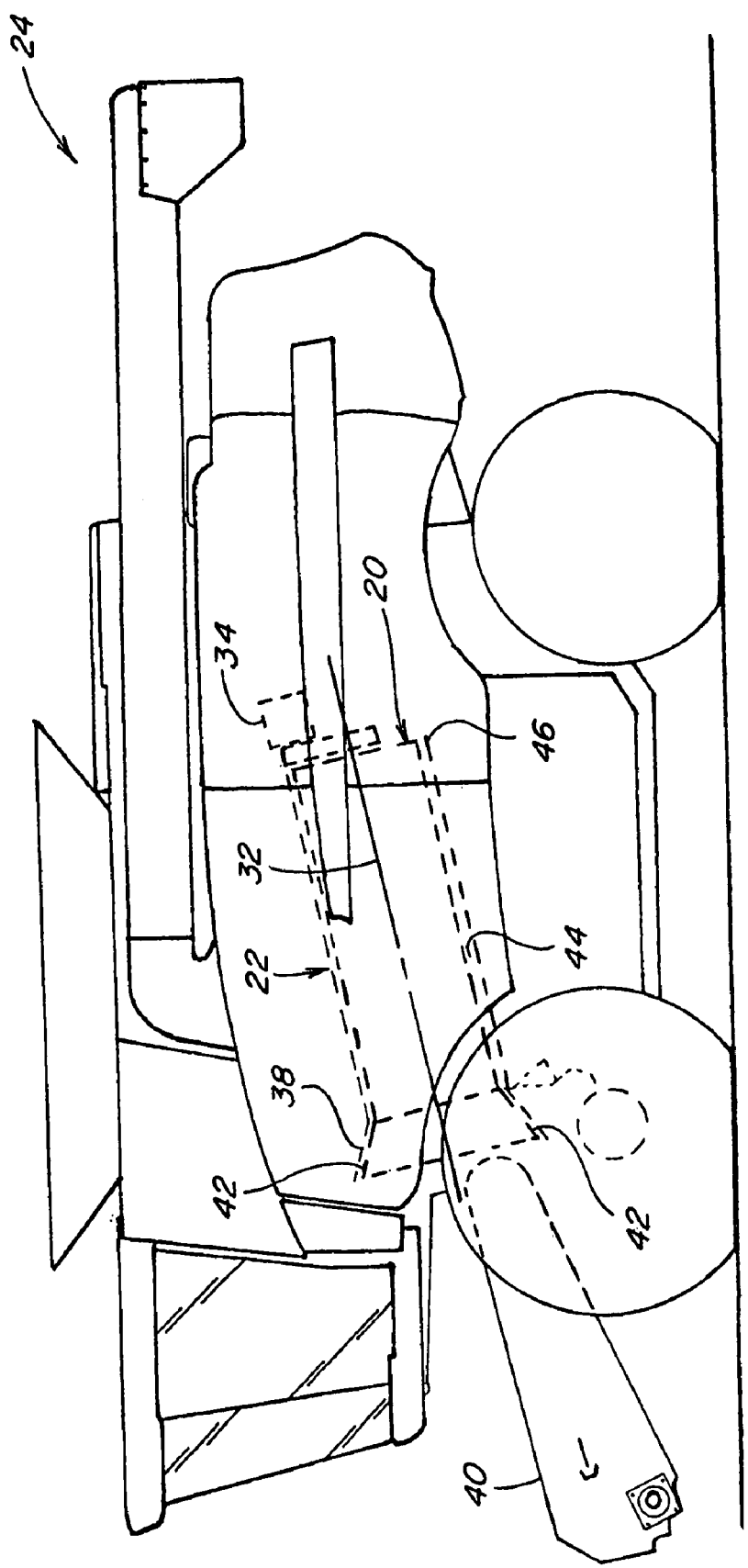
FIG. 1 is a side view of an agricultural combine having a threshing system including a rotor according to the present invention.

Turning now to the drawings wherein aspects of a preferred embodiment of a rotor 20 and method of making the same according to the present invention are shown, in FIG. 1, rotor 20 is shown in a threshing system 22 of a representative agricultural combine 24. Agricultural combine 24 is representative of an axial flow type combine including one or two fore and aft extending rotors, but it should be understood that it is contemplated that rotor 20 and the method of the invention can likewise be used with rotors of other types of combines, including, but not limited to, conventional types wherein one or more rotors of the invention will be mounted in a transverse orientation within a body of the combine.

Figure 2:
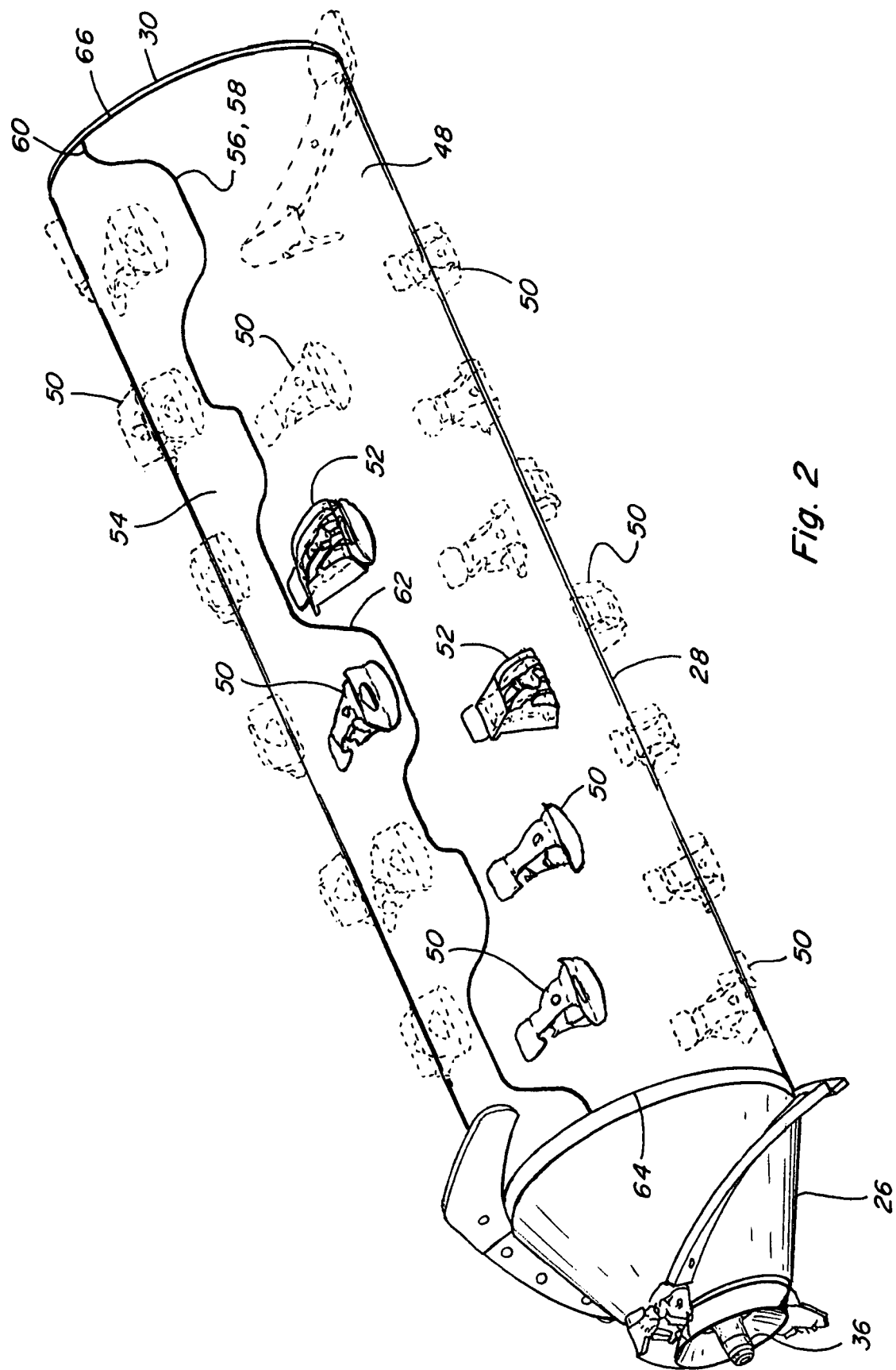
FIG. 2 is a perspective view of the rotor of the invention.

Referring also to FIG. 2, rotor 20 generally includes an inlet segment 26 which is forwardly located in this application; a main body segment 28, and a bulkhead 30, which is rearwardly located. Rotor 20 is supported for rotation about a fore and aft extending inclined rotational axis 32, as driven by a drive mechanism 34 rotatably drivingly connected to bulkhead 30 at the rear end of the rotor. Inlet segment 26 includes a forwardly extending stub shaft 36 supported on a hanger bearing assembly for this purpose. Inlet segment 26 is disposed within a frusto-conical shaped inlet chamber 38, into which harvested crop material is fed from a feeder 40 of combine 24. The crop material is harvested by a header (not shown) mounted on the forward end of feeder 40 and operable for cutting crops from a field as combine 24 is driven forwardly thereover, in the well-known manner.

Inlet segment 26 includes a pair of diametrically opposed helical flights 42 extending therearound (removed in FIG. 2 for clarity) and operable during the rotation of rotor 20 for conveying the crop material rearwardly and into a space 44 extending around main body segment 28. Space 44 is defined by an inner circumferential surface of a concave 46 extending circumferentially at least partially around an outer circumferential surface 48 of main body segment 28. A plurality of threshing element mounts 50 are mounted in a generally helical array around surface 48 of main body segment 28. Mounts 50 are configured for supporting a plurality of threshing elements 52, which can include, for instance, rasp bars of well known construction, operable during the rotation of the rotor for conveying the crop material through space 44. Threshing elements 52 include features which, in combination with features of concave 46, operate to thresh or separate smaller elements of the crop material including grain from larger elements, namely stalks, cobs, leaves and the like. The smaller elements including the grain, then fall through spaces through concave 46 to a cleaning system (not shown) of the combine for further processing. The straw and other larger elements are continued to be conveyed through space 44, and are propelled rearwardly from the threshing system for disposal, in the well known manner.

During the threshing process, the radial outer portions of threshing elements 52 and the inner circumferential surface of concave 46 are separated by a gap, the width of which is a critical parameter in the quality of the threshing. This gap will be set for a particular grain size, and setting the gap larger will typically result in a less aggressive threshing action so as to allow more grain to remain with the straw and other large elements thereby decreasing grain yield. Setting the gap smaller will effect more aggressive threshing, which can result in damage to the grain, particularly cracking. And, differences in the radial position of the threshing elements about rotor 20 can result in variances in the threshing, as well as potentially damaging and annoying vibrations. It is therefore typically desired to have the gap be very precise and uniform within a few millimeters or a small fraction of an inch for a particular harvesting environment. To achieve this precision and uniformity, outer circumferential surface 48 on which threshing element mounts 50 are mounted, should be uniformly round and centered about rotational axis 32.

A disadvantage that has been observed with prior art rotor constructions is that, due to the density and locations of the threshing element mounts around the rotor 20, and the welded construction of the rotor, some of the mounts are likely to be located on seams of the rotor. The seams will typically be straight, extending along one side of the rotor, or extend helically therearound, and may be raised and uneven. As a result, at any location on a weld seam where a mount 50 is to be placed, the seam is typically ground flush with the surface 48 in an additional manufacturing step. This can also entail one or more additional steps, for inspection, and possible repeating of the grinding step, to achieve the desired flushness.

Figure 5:
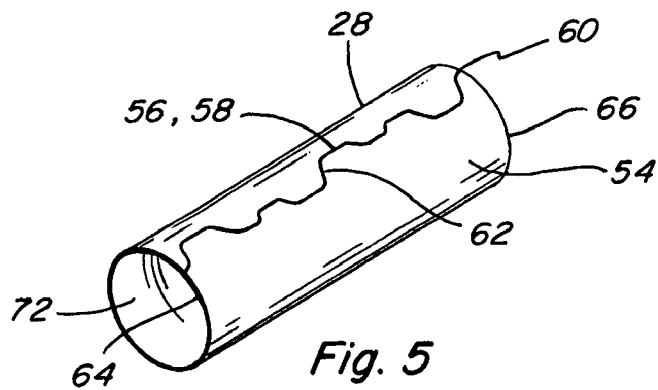
FIG. 5 is perspective view of the main body segment.
Figure 3:
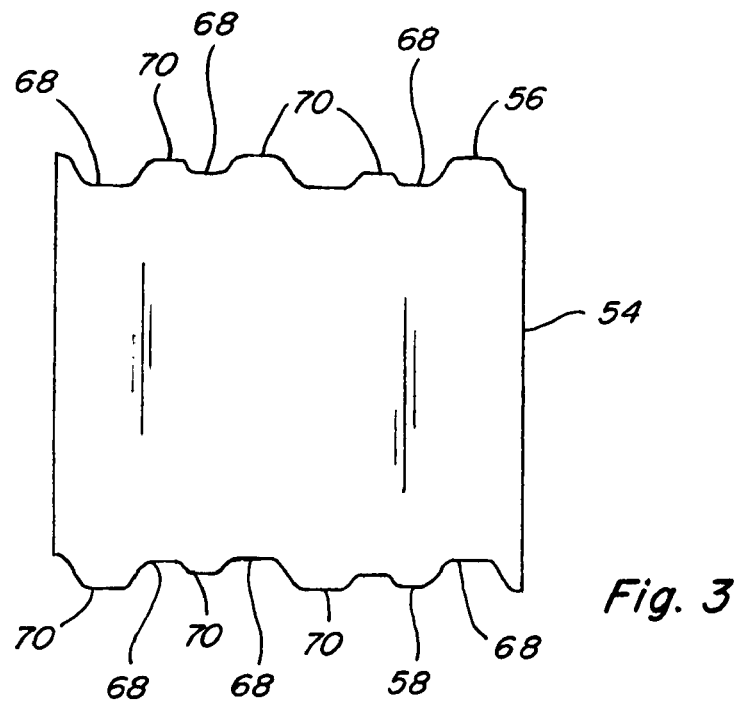
FIG. 3 shows a sheet used for making a main body segment of the rotor of FIG. 2.
Figure 4:
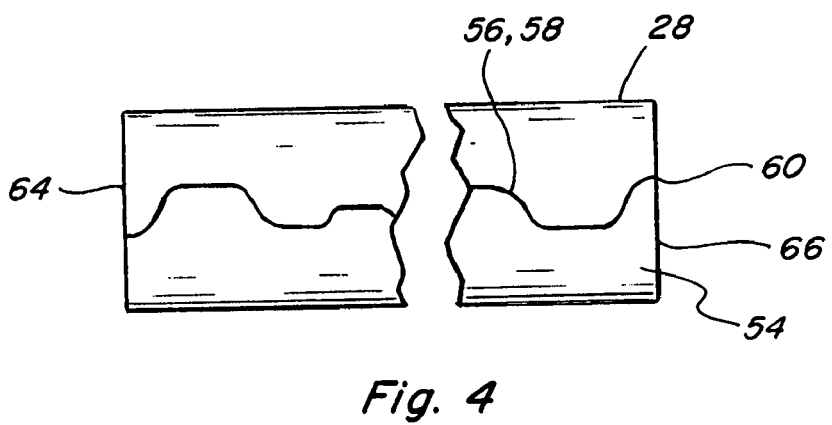
FIG. 4 is a side view of the main body segment.

Referring also to FIGS. 3, 4 and 5, the present invention overcomes and avoids the disadvantages of the prior art rotor constructions, by utilizing a main body segment 28 made from a sheet 54 formed into a tube and including specially shaped interlocking edges 56 and 58 forming a serpentine joint or seam 60 routed around points of attachment of threshing element mounts 50 to the sheet 54. Serpentine seam 60 is preferably a weld and has a generally stepped shape symmetrical about a midpoint 62 between ends 62 and 64 of the segment 28.

According to aspects of a preferred method for making main body segment 28, sheet 54 comprises an outer surface, which will form outer circumferential surface 48, and including opposite end portions which will form ends 64 and 66, and opposite first and second peripheral edges 56 and 58 extending between the end portions and which will form seam 60. More particularly, edges 56 and 58 each have a stepped shape comprising recessed edge portions 68 and protruding edge portions 70 arranged in an alternating pattern extending between the end portions, which edge portions 68 and 70 are configured and positioned so as to be interlockable when brought together forming sheet 54 into the tube of main body segment 28. When this is done, the outer surface of the sheet becomes outer circumferential surface 48, and the opposite end portions of the sheet form opposite circular shaped openings, as represented by opening 72 in FIG. 5, and the first and second peripheral edges 56 and 58 are brought together so as to be interlocked. This can be done using a strangulation fixture or mandrel. Edge portions 68 and 70 can be precision formed by plasma cutting, die forming, or another suitable manufacturing process, so as to be precisely mating and interlocking, and such that ends 64 and 66 are precisely perpendicular about rotational axis 32, or otherwise shaped and/or positioned. Welding of seam 60 can be done using a single track welder, and can include an external or internal weld only, or both if desired.

As a result of seam 60 being routed around attachment points for threshing element mounts 50, no grinding or other leveling or treatment of the seam is required for the attachment of the mounts. Thus, manufacturing steps are saved. Seam 60 can be welded, and mounts 50 welded on, without additional intermediate steps for grinding or inspection.

Here, it should be noted that it is contemplated according to the present invention that seam 60 can have variety of shapes and follow paths different from that illustrated herein, such as, but not limited to, a more rounded shape, or the like, which extend around or otherwise are not coincident with the attachment areas for mounts 50.

Rotor 20 is completed by attachment of inlet segment 26, bulkhead 30, threshing elements 52, and other components. Inlet segment 26 and bulkhead 30 can be attached, for instance, by welding, fasteners, or the like. Threshing elements 52 can also be welded, or fastened.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of making a rotor for a threshing system of an agricultural combine, comprising steps of:
    providing a sheet having an outer surface including opposite end portions, a first peripheral edge extending between the end portions having a stepped shape and a second peripheral edge opposite the first peripheral edge;
    forming a stepped shape along the first and second peripheral edges, the stepped shape extending between the end portions, wherein forming the stepped shape includes forming recessed edge portions and protruding edge portions into a plurality of shapes wherein no two recessed and protruding edge portions have the same shape along each respective first and second peripheral edge, the first and second peripheral edges being configured and positioned so as to be interlockable when brought together for forming the sheet into a tube;
    forming the sheet into a tube wherein the outer surface extends circumferentially around the exterior of the tube and wherein the opposite end portions of the sheet form opposite circular shaped openings so;
    attaching a plurality of threshing element mounts to the outer surface at attachment points on the recessed and protruding edge portions around the tube in spaced relation to the first and second peripheral edges; and
    interlocking the first and second peripheral edges together, wherein because of the stepped shape the first and second peripheral edges define a serpentine seam routed around the attachment points.

2. The method of claim 1, wherein the interlocked first and second peripheral edges are welded together.

3. The method of claim 1, wherein the threshing element mounts are welded to the outer surface.

4. The method of claim 1, wherein the attachment points are in a predetermined pattern forming a helical pattern.

5. The method of claim 1, wherein the tube has a cylindrical shape.

6. A method of making a rotor for a threshing system of an agricultural combine, comprising steps of:
    providing a sheet having an outer surface including opposite end portions, a first peripheral edge extending between the end portions and a second peripheral edge opposite the first peripheral edge to a tube;
    forming a stepped shape along the first and second peripheral edges, the stepped shape extending between the end portions, wherein forming the stepped shape includes forming recessed edge portions and protruding edge portions into a plurality of arcuate only shapes, wherein no two recessed and protruding edge portions have the same shape along each respective first and second peripheral edge, the first and second peripheral edges being configured and positioned so as to be interlockable when brought together for forming the sheet into a tube;
    forming the sheet into the tube wherein the outer surface extends circumferentially around the exterior of the tube and wherein the opposite end portions of the sheet form parallel, oppositely facing circular openings;
    attaching a plurality of threshing element mounts to the outer surface at attachment points on the recessed and protruding edge portions around the tube in spaced relation to the first and second peripheral edges; and
    welding the interlocked first and second peripheral edges together, wherein because of the stepped shape the first and second peripheral edges define a serpentine seam routed around the attachment points.

7. The method of claim 6, comprising a further step of mounting an element to the tube in covering relation to at least one of the circular openings.

8. The method of claim 6, wherein the attachment points are in a predetermined pattern forming a helical pattern.

9. The method of claim 6, wherein the tube has a cylindrical shape.

* * * * *